United States Patent Office 2,720,796
Patented Oct. 18, 1955

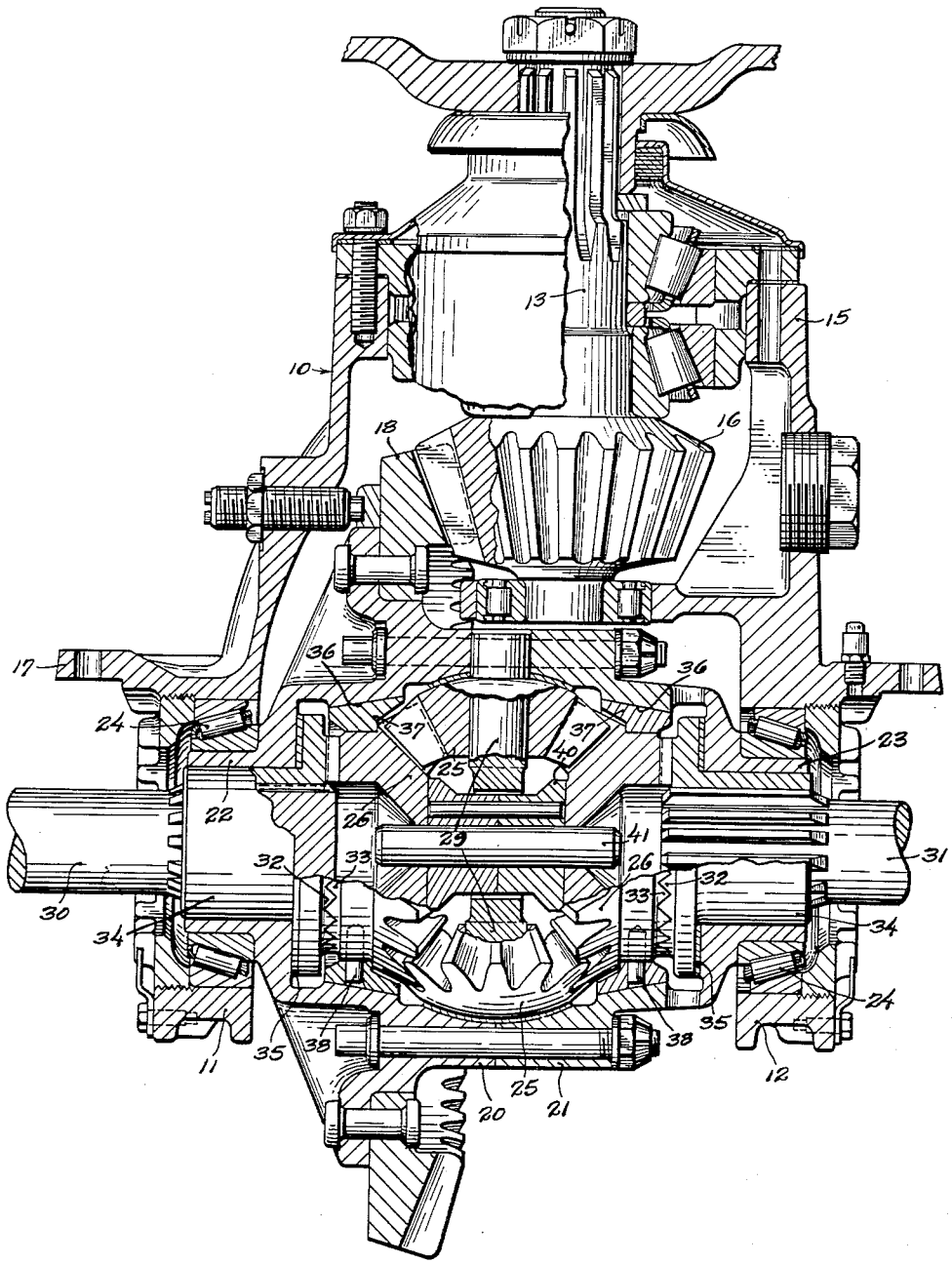

2,720,796

POWER-DIVIDING DIFFERENTIAL

Carl E. Schou, Oshkosh, Wis.

Application August 18, 1950, Serial No. 180,162

7 Claims. (Cl. 74—711)

This invention relates to differential structure, and particularly a differential in the nature of a power-divider which looks to the provision of a continuing traction under such an adverse road condition as causes one of the two driven wheels of a live axle to exhibit slippage. Power-dividing structures, both of the inter-axle type applied to tandem drives and the axle type applied between the two traction wheels of a single live axle, are rapidly becoming standard equipment for all heavy-duty vehicles, being in fact almost compulsory for vehicles used in off-highway services. In power-dividing differentials, and this is true with the present structure as well as all prior structures of which I am aware, the end accomplishments in view are the same. When the vehicle is being driven under normal conditions, the power divider is functionally inactive and in no way affects the ordinary working of the differential, maintaining, between the two sides, substantially equal torque permitting minor differences in R. P. M. averaging out to a uniform speed. When the condition of the ground surface being traversed causes either one of the two wheels to lose traction, the increased speed of the idly spinning wheel causes the differential to be functionally inactivated and the side retaining traction picks up driving energy which, by the nature of a differential, perforce is entirely dissipated if either wheel is free to spin.

The principal object of the present invention is to provide an unusually simple and compact power-dividing unit adapted to be embodied in a transmission of the ordinary bevel-gear type and so engineered as to require no more space than is required by a differential lacking the power-dividing feature, hence permitting the same to be contained within a standard housing, and additionally, excepting only for special designing of the secondary differential gears and the gear-driven case in which these and the primary differential gears are contained, to permit interchange of parts with the parts of a standard differential.

These and other objects and advantages of the invention will appear and be understood in the course of the following description and claims, the invention consisting in the novel construction and in the adaptation and combination of parts hereinafter described and claimed.

In the accompanying drawing, the single figure is a fragmentary horizontal sectional view with parts in elevation illustrating a differential structure embodying a power-dividing unit constructed in accordance with the teachings of the present invention.

Referring to said drawing, the numeral 10 designates the gear housing of a standard bevel-gear differential providing co-axial spaced journal heads, as 11 and 12, at the two sides, and presenting the customary necked extension 15 giving journal support to the shaft 13 which carries the driving pinion 16. The bowl complement of the gear housing, connecting by bolts to a flange 17 of the latter, is deleted from the illustration. Meshing with the driving pinion is a ring gear 18, and riveted or otherwise integrated with this driving gear is a divided case whose boltably connected congruent parts 20 and 21 each present an outwardly directed and center-bored hub-section, as 22 and 23, which is given a thrust-and-journal support from roller bearings 24 fitted in the openings of the journal-heads 11 and 12, respectively.

It will perforce be apparent as the description proceeds that the pitch surface which characterizes the teeth of the drive gearing, and namely the drive pinion and its intermeshing ring gear, is unimportant to the present invention, by which I mean to say that the concerned differential may be either of the illustrated bevel gear, spiral bevel, or hypoid-drive type. The invention concerns itself with any differential like or similar to that illustrated, in which the divided case acts as a cage and houses intermeshed primary and secondary differential gears 25 and 26, with the primary gears 25 being generally four in number taking a planetary mounting from symmetrically spaced spindles 29 movable bodily with the cage, and with the secondary gears being two in number opposingly placed to occupy axially localized positions at opposite sides of the planetary gears. In the usual concept of a differential, these secondary differential gears are splined or otherwise locked for unitary rotary movement upon the inner ends of respective axle shafts 30 and 31. In the present invention, the secondary differential gears are not fixedly carried upon the axle shafts but rather establish a driving couple through mating angular teeth formed upon two interfitting contrate jawed heads, as 32 and 33, one of which heads is formed upon the outer face of a respective secondary differential gear and the other of which heads is formed upon the inner face of a flanged collar whose hub 34 is splined to the related axle shaft. Said collars have their hubs journaled within the hub sections 22 and 23 of said divided case, and bear by their flanges against wear members 35 which take a thrust bearing against internal shoulders presented at each end of the case. Inwardly from said thrust-taking shoulder, each congruent part of said divided case is internally formed with a conical face 36 developed concentric to the center line of the axle shafts with the greater diameter being proximal to the split line of the case.

Cone-shaped clutching rings 37 are provided to seat upon said internal cone surfaces of the case, and these clutching rings each sleeve upon a related secondary differential gear and are made secure thereto by a pin or pins 38. The spindles 29 which carry the primary differential gears radiate from a centrally apertured spider, and there is slidably journaled within this spider a center-bored separator 40 applied as a thrust-transferring spacer between the two secondary differential gears 25 and 26 and held in co-axial relation with the latter by a traversing pin 41. The relationship of parts is such that a slight tolerance remains, under normal operating conditions, between the internal conical faces 36 of the divided case 20—21 and their associated clutching rings 37—37, and there is provided between the contrate teeth of the jawed heads 32—33 a sufficient clearance to take up this tolerance by endwise movement given to the inner head 33 of either jaw set by unopposed thrust from its related outer head 32. The angular cut given to the teeth of said jawed head is such that where one output shaft absorbs all the differential's input torque (when the traction of one wheel is zero) one coupling will produce a thrust to the opposite cone clutch that is of such magnitude that the torque capacity of the same clutch will be equal to or larger than the differential's input torque.

In the operation of the described power-dividing differential, the normal working of the differential gears is unaffected as long as the amount of differential action is within normal limits and such, for example, as occurs when one traction wheel turns at a somewhat higher speed than the other traction wheel either in consequence of traversing a road bend or, as frequently occurs, by reason of minor differences in tire diameters. Under these normal conditions, the secondary differential gears more or less float and allow of complete compensatory movements of the wheels. When, however, one wheel's R. P. M. abnormally exceeds a desirable differentiation, as by noticeable loss of ground traction for that wheel, the thrust force imposed by the bias faces of the concerned outer teeth 32 upon the bias faces of the concerned inner teeth 33 causes the teeth 33 upon said inner side of the concerned jaw-coupling to climb the bias faces of the opposing teeth 32 and this bias climb exerts thrust through the spacer 40 upon the other secondary differential gear 26 to responsively shift the related ring 37 axially in the minor degree necessary to establish a frictional couple between said ring and the divided case 20—21. With the case then locked to the said secondary differential gear 26 to which said coupling ring 37 is pinned, the wheel at the side opposite the spinning wheel takes a direct drive from the case with the result that the differential gears 26—26 move bodily with the case, and the axle shafts 30—31, turning as one, develop traction through the wheel which retains traction. The locked condition obtains as long as the torque to one wheel is double or more than the torque transmitted to the other wheel. However, as the thrust on the friction coupling is always in direct proportion to the difference in torque transmitted to the wheels, a torque transfer always occurs as long as there is a difference in the traction of the wheels.

The invention admits of minor changes in the details of construction without departing from the spirit of the invention, and it is accordingly my invention that no limitations are to be implied and that the hereto annexed claims be given the broadest scope in their interpretation which the employed language fairly permits.

I claim:

1. In differential gearing, aligned axle shafts each having upon its inner end a respective contrate head serving as an outer jaw and formed with angular teeth the inclined surfaces of which slope correspondingly in opposite directions from a median high point, a rotatable casing journaled to turn about the center of said axles as an axis and holding the jaws of the latter against outwardly directed thrust, a spindle carried by the casing with its axis placed perpendicular to the rotary axis of the latter, a pinion journaled upon the spindle, a pair of oppositely disposed gears interposed between and placed co-axial to said outer jaws with the gear teeth in mesh with the teeth of the pinion and upon the back faces providing contrate jaws serving as inner mating complements of the outer jaws, a separator between said gears acting to transmit thrust from one to the other and so dimensioned as to permit minor endwise motion of the gears within limits prescribed by the outer jaws, and means operating by thrust exerted from the angular teeth of either outer jaw upon the teeth of the mating inner jaw for momentarily locking the other inner jaw to the casing and thus responsively reducing the differential action of the gear-and-pinion set to cause the axle shafts to turn in unison with the casing.

2. In differential gearing, aligned axle shafts, a respective contrate driven head splined to the inner end of each of said shafts and presenting inwardly directed angular teeth the inclined surfaces of which slope correspondingly in opposite directions from a median high point, means resisting outwardly directed thrust imposed upon said heads, rotary driving heads interposed between the driven heads to lie co-axial to the latter and providing gear teeth upon the front faces and contrate angular teeth upon the back faces with the angular teeth interfitting with the angular teeth of a related driven head, the angularity of said interfitting teeth being such that turning motion exerts a thrust force of greater magnitude than the transferred torque, a rotatable cage journaled to turn about the center of said shafts as an axis and giving journal support to a planetary gear meshing the gear teeth of both of said driving heads, and means operating by thrust carried back from the angular teeth of either driven head to the interfitting teeth of the related driving head not countered by comparable thrust originating in the other driven head for momentarily locking the driving and driven heads for bodily rotation with the cage.

3. In differential gearing, two spaced sets of meshed contrate heads journaled for rotation about a coinciding axis and having the interfitting teeth bias-cut with the angularity such that turning motion exerts a thrust force of greater magnitude than the transferred torque, a pair of axially spaced inwardly facing gears interposed between and made to move both axially and rotatively one with one and the other with the other of the inner heads of the two said sets, means connecting the two gears for unitary endwise motion while permitting relative rotation, a cage journaled for rotation about the center of the contrate heads as an axis and holding the spacing between the outer heads of said sets to a fixed constant leaving minor clearance for endwise play of the interposed gears and associated inner heads, a pinion in mesh with both of said gears and movable planetarily with the cage, and means operating by endwise motion of the gears reflecting non-countered thrust carried back from the outer to the inner head of either said set for establishing a frictional couple between the cage and the gear which lies remote from the originating thrust.

4. In differential gearing, two spaced sets of meshed contrate heads journaled for rotation about a coinciding axis and having the interfitting teeth bias-cut with the angularity such that turning motion exerts a thrust force in direct proportion to the torque transmitted, means resisting outwardly directed thrust imposed upon said heads, a pair of axially spaced gears interposed between and made to turn in unison one with one and the other with the other of the inner heads of the two said sets and admitting to minor endwise movement within limits prescribed by the outer heads of said meshed sets, means acting in complement with the gears to establish a differential drive to the two sets of heads, and means including friction devices having movement relative to one another in the same direction as the aforesaid endwise movement operating by thrust carried back from the outer to the inner member of either of said sets of heads not countered by comparable thrust carried back in the other set for causing the two gears to turn as one and thus responsively inactivating the differential action.

5. In differential gearing, two spaced sets of meshed contrate heads journaled for rotation about a coinciding axis and having the interfitting teeth bias-cut with the angularity such that turning motion exerts a thrust force in direct proportion to the torque transmitted, a pair of axially spaced and inwardly facing bevel gears interposed between and made to move both axially and rotatively each in unison with a related inner head of the two said sets, a rotatable casing for said heads and gears providing an internal shoulder at each end holding the other heads of said sets against outwardly directed thrust and formed inwardly from each of said thrust shoulders with a respective inwardly flaring conically developed annular face, a normally inactive friction ring for each of said conical faces fixedly secured to a respective said gear, a bevel pinion carried by the casing with its teeth in mesh with both of said gears, a separator between said gears acting to transmit thrust from one to the other and so dimensioned as to permit minor endwise movement of the gears within limits prescribed by the outer heads of said sets, a ring gear fast to the casing, and a drive gear meshing said ring gear.

6. In apparatus for transmitting motion, a set of co-axial outer and inner contrate members having meshed thrust-transferring angular teeth, another set of outer and inner contrate members likewise having meshed thrust-transferring angular teeth and disposed in spaced co-axial relation to the first said set with the outer member made axially immovable relative to the outer member of the first said set, the inner said members admitting to relative rotation and being arranged for minor concerted endwise movement within limits prescribed by the outer said members, means acting in complement with the two sets of members to produce differential rotary movements as between the two sets when the transfer of thrust is of comparatively equal magnitude as between the two sets, and means including friction devices having movement relative to one another in the same direction as the aforesaid endwise movement for reducing said differential action and causing the two sets to turn as one when the transfer of thrust is of unequal magnitude as between the two sets.

7. In apparatus for transmitting motion, a set of co-axial outer and inner contrate members having meshed thrust-transferring angular teeth, another set of outer and inner contrate members likewise having meshed thrust-transferring angular teeth and disposed in spaced co-axial relation to the first said set with the outer member made axially immovable relative to the outer member of the first said set, the inner said members admitting to relative rotation and being arranged for minor concerted endwise movement within limits prescribed by the outer said members, means acting in complement with the two sets of members to produce differential rotary movements as between the two sets under normal conditions of drive causing the transfer of thrust to be of comparatively equal magnitude as between the two sets, and means including normally inactive friction devices having movement relative to one another in the same direction as the aforesaid endwise movement serving to establish a differential-modifying connecting couple between the two sets when the transfer of thrust is of unequal magnitude as between the two sets.

References Cited in the file of this patent

UNITED STATES PATENTS

| 1,529,804 | Nogrady | Mar. 17, 1925 |
| 1,556,101 | Goodhart | Oct. 6, 1925 |
| 1,585,438 | Taylor | May 18, 1926 |

FOREIGN PATENTS

| 655,398 | Germany | Jan. 14, 1938 |